United States Patent [19]

Scheve

[11] 4,277,593

[45] Jul. 7, 1981

[54] NOVEL POLYMERS BASED ON AZIDO AND SILANE MONOMERS

[75] Inventor: Bernard J. Scheve, Wilmington, Del.

[73] Assignee: Hercules Incorporated, Wilmington, Del.

[21] Appl. No.: 101,948

[22] Filed: Dec. 10, 1979

[51] Int. Cl.$^3$ .................... C08F 226/02; C08F 230/08
[52] U.S. Cl. ............................ 526/279; 204/157.22; 204/159.23; 260/42.15; 260/349; 428/429; 526/259
[58] Field of Search ......................................... 526/279

[56] References Cited

U.S. PATENT DOCUMENTS 3,369,009  2/1968  MacArthur ........................... 526/84
3,369,030  2/1968  MacArthur ........................... 260/349
3,398,210  8/1968  Plueddemann et al. ............. 260/4 R
3,715,371  2/1973  Thomson ......................... 260/29.2 M Primary Examiner—Stanford M. Levin
Attorney, Agent, or Firm—Marion C. Staves

[57] ABSTRACT

Novel polymers are disclosed which are based on an ethylenically unsaturated monomer containing at least one azide group and another ethylenically unsaturated silane monomer. These materials are useful as coupling agents for thermoformable polymers such as polyolefins and inorganic fillers. Optionally the polymers can contain other ethylenically unsaturated monomers as spacers or extenders for the more expensive azide or silane monomers.

6 Claims, No Drawings

NOVEL POLYMERS BASED ON AZIDO AND SILANE MONOMERS

This invention relates to a novel class of polymers and to the use of thereof to promote adhesion between organic polymers and inorganic materials. More specifically, it relates to copolymers which contain both azido and silane functional groups.

There are many occasions when it is desirable to adhere a polymer to an inorganic material. For example, polymers are frequently loaded with inorganic particulate matter as fillers, reinforcers, extenders or pigments (referred to generically as "fillers"). Polymers are also employed as wire coatings and as protective coatings on other metal objects. In still other cases, they are applied to glass or, more likely, glass fibers and rovings are employed as reinforcing materials in the polymers. For various reasons, the bond between the polymer and the inorganic material is either not good initially or it fails under the conditions of use, e.g., when subjected to stress or in the presence of moisture, to name only two frequently troublesome conditions.

In attacking this problem, investigators have found that a silane which contains hydrolyzable organic radicals attached to its silicon atom will react with or otherwise firmly associate itself with any of the inorganic materials commonly employed as fillers or the like in polymers or with which the polyme is used, thereby improving adhesion of the polymer thereto. U.S. Pat. No. 3,715,371 to Thomson teaches a new class of compounds known as azidosilanes which, in addition to hydrolyzable organic radicals, contain azide groups in a single machine. The azide moiety, when activated in an appropriate manner, is reactive with the polymer and thus serves as a bond to the polymer while the silane associates with the filler.

The compounds taught by Thomson are among the best materials found to date for adhering fillers and polymers. However, their use is somewhat limited by the fact that the azide moiety is expensive and, being present in the molecule in relatively high concentration, causes the compounds to be quite expensive. For many applications a lower concentration of azide groups relative to silane groups would be equally effective in promoting adhesion to the polymer and for most applications a more attractive price is important. It is the purpose of this invention to provide a new clas of coupling polymers which incorporate both azido groups and silane groups substituted by a hydrolyzable radical, but wherein the concentration of either functional group can be varied over a wide range either absolutely or relative to one another.

According to the invention there are provided coupling polymers comprised of:
(a) 20 to 80% by weight of an ethylenically unsaturated monomer containing at least one azide group;
(b) 20 to 80% by weight of an ethylenically unsaturated silane monomer wherein the silicon molecule is substituted with at least one hydrolyzable radical;
(c) 0 to 60% by weight of a non-functional ethylenically unsaturated monomer; and
(d) 0 to 10% by weight of a non-functionalized ethylenically unsaturated monomer which is capable of absorbing actinic radiation.

The ethylenically unsaturated azide monomers useful in the coupling polymers of this invention can be of the azido type $R_1$—$N_3$, the azidoformate type

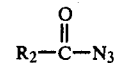

or the sulfonyl azide type $R_3$—$SO_2N_3$, where the radicals $R_1$, $R_2$ and $R_3$ are monoethylenically unsaturated moieties capable of being polymerized through the double bond.

An exemplary radical which can be represented by $R_1$ is the styryl radical

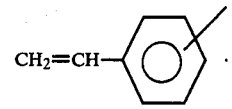

Radicals represented by $R_2$ include, e.g., alkyleneoxy and alkyloxy-alkyleneoxy radicals represented by the formula

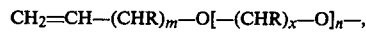

where R is H or $CH_3$, m is 1–10, x is 2–4 and n is 0–10, such as allyloxy, methallyloxy, 3-methyl-3-butenyloxy, 2,3-dimethyl-3-butenyloxy, allyloxyethyleneoxy and methallyloxypropyleneoxy; radicals represented by the formula

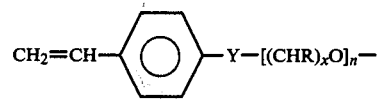

where Y is O or NH and x is 2–4, such as styryloxy, styrylimino and vinylphenoxyethyoxy; radicals of the formula

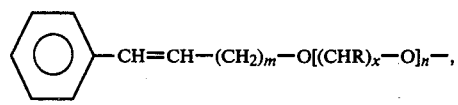

such as cinnamyloxy; radicals of the formula

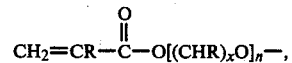

such as acryloxy, methacryloxy, acryloxyethyleneoxy, and

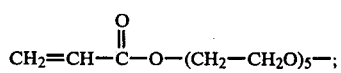

and radicals of the formulas

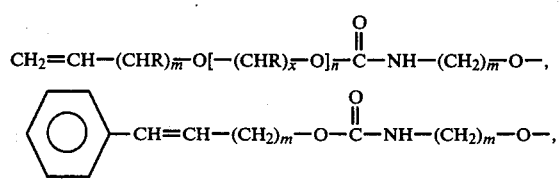

-continued
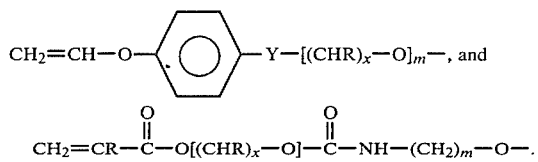
Radicals represented by R₃ include, e.g., styryl; radicals represented by the formulas
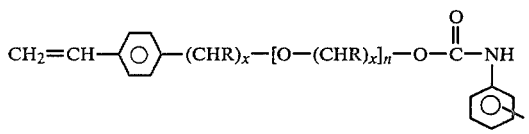
and
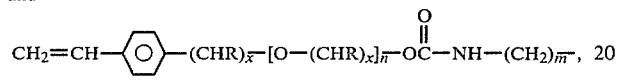
such as the radicals
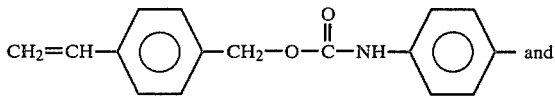
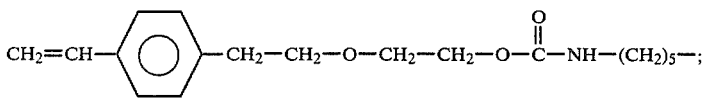
radicals represented by the formulas
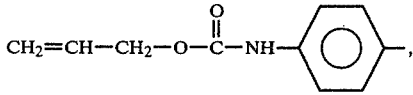
or
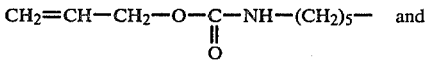
such as
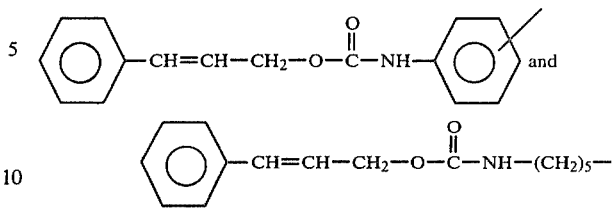
radicals represented by the formulas
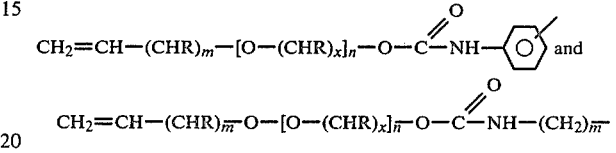
such as the radicals
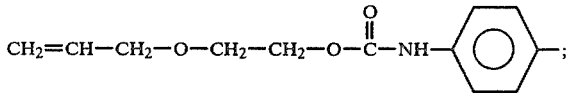
radicals represented by the formulas
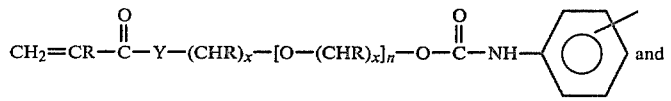
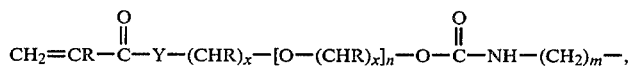
such as the radicals
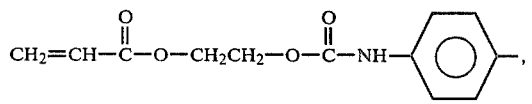
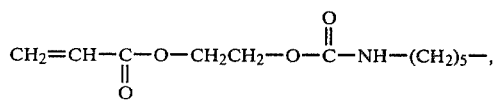

-continued

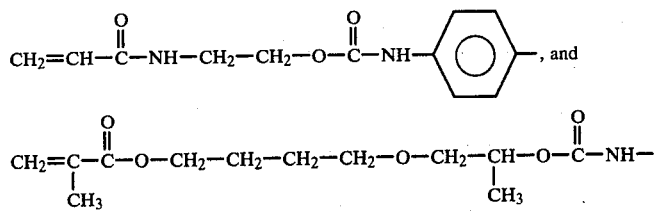, and

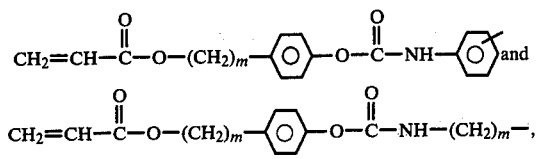

radicals represented by the formulas

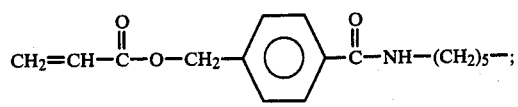 and

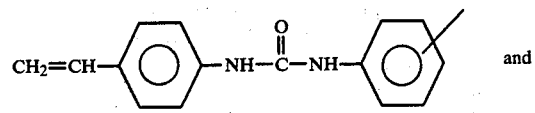, such as

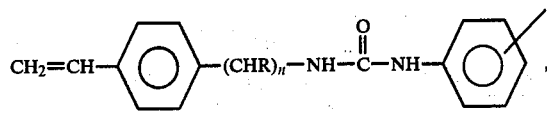;

the radicals represented by the formulas

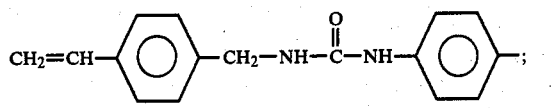 and

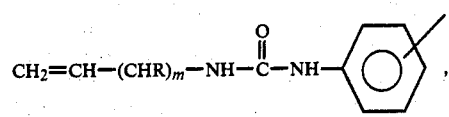;

the radicals represented by the formulas

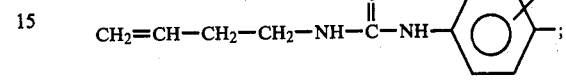

such as the radical

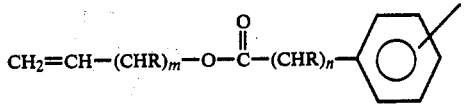, radicals represented by the formula

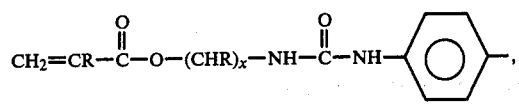

such as the radical

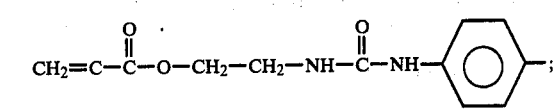;

radicals represented by the formula

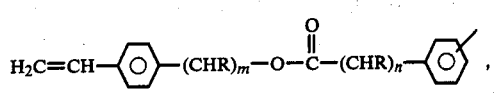

such as the radical

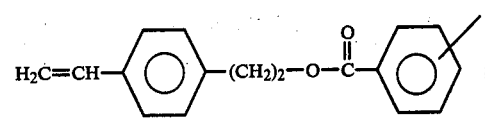;

radicals of the formula

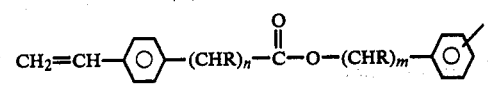, such as the radical

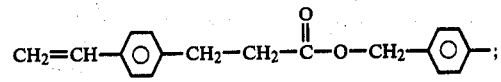;

radicals of the formula $CH_2=CH-(CHR)_m-O-\overset{O}{\underset{\|}{C}}-(CHR)_n-\bigcirc$, such as the radical

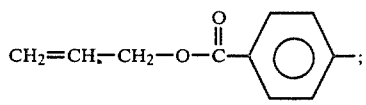

radicals of the formula

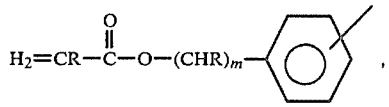

such as the radical

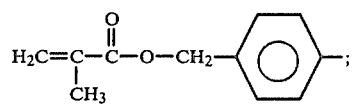

radicals of the formula

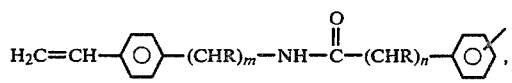

such as the radical

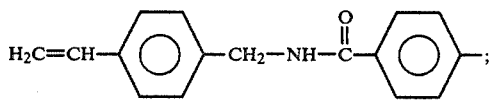

radicals of the formula

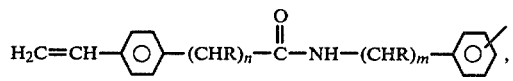

such as the radical

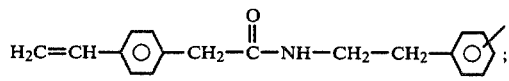

radicals of the formula

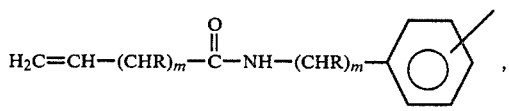

such as the radical

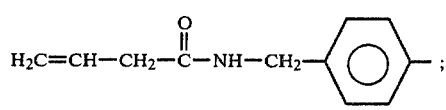

radicals of the formula

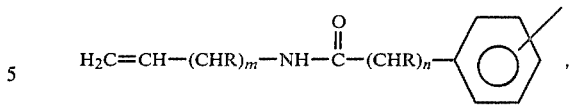

such as the radical

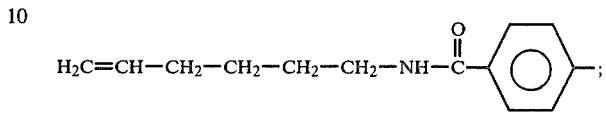

and radicals of the formula

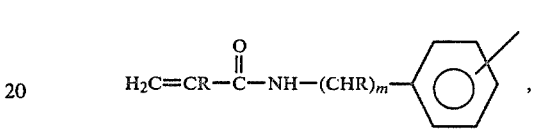

such as the radical

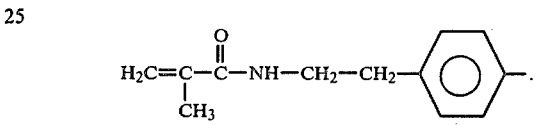

Exemplary silane monomers which can be employed in the polymers of this invention include, e.g., vinyltriethoxysilane, vinyl-tris-(2-methoxyethoxy) silane, gamma-methacryloxypropyltrimethoxysilane, N-gamma-aminopropyltrimethoxysilyl-N-m-vinylbenzylamine and N-gamma-aminopropyltrimethoxysilyl-m-vinylphenyl carbamate. A host of other usable silane monomers is disclosed in U.S. Pat. No. 3,398,210, which disclosure is incorporated herein by reference.

As stated previously, the azido moiety and the silane moiety are the sought after components in the copolymer. The azide-containing monomer and the silane-containing monomer are employed in the ratio of about 1 to 4 to 4 to 1 moles of azide functionality per mole of silane functionality.

The coupling polymer optionally also contains up to about 60% of a non-functionalized ethylenically unsaturated monomer. By "non-functionalized" is meant that no azide or silane functional group is present. The purpose of this monomer is primarily to act as a spacer in order to extend the more expensive azide or silane monomers. If the coupling polymer is intended for a specific predetermined application, this spacer monomer can be selected according to its affinity for specific filler materials. With the single limitation that it contain no azide or silane functionality, any ethylenically unsaturated monomer which copolymerizes with the azide and silane monomers can be employed as the non-functionalized component. For example, there can be used ethylene, butadiene, isoprene, acrylonitrile, methacrylonitrile, allyl acetate, allyl chloride, allyl chloroacetate, methallyl acetate, methallyl chloride, isopropenyl acetate, chloroprene, styrene, methyl styrene, o-, m- or p-chlorostyrene, 2,5-dichlorostyrene, pentachlorostyrene, m- or p-bromostyrene, p-dimethylaminostyrene, diethyl fumarate, diethyl maleate, maleic anhydride, methyl acrylate, ethyl acrylate, isobornyl acrylate, methyl methacrylate, ethyl alpha-chloroacrylate, or 2-vinylpyridine. Other non-functionalized vinyl monomers will be readily apparent to the practitioner.

Still further, the coupling polymer can contain up to about 10% by weight of an ethylenically unsaturated monomer which is capable of absorbing actinic radiation and transferring it to the azide group to promote decomposition and activation of the azide. Exemplary actinic radiation absorbing monomers are, e.g., N-vinyl carbazole, o-, m- and p-vinylbenzophenone, vinyl phenyl ketone, beta-vinyl naphthalene and 4-acryloxybenzophenone.

The ethylenically unsaturated monomers are readily polymerized by free radical techniques known to the art. The catalyst systems used for such polymerization are known catalyst materials comprising an oxidizing agent as an initiator and a reducing agent as an activator. Any such combination can be employed. Preferred oxidizing agent initiators are persulfates such as potassium, sodium or ammonium persulfate, and peroxides such as benzoyl peroxide, cumene hydroperoxide, t-butyl peroxide, and alkali metal bromates and chlorates. Preferred reducing agent activators are bisulfites, such as potassium, sodium or ammonium bisulfite; sulfites such as potassium, sodium or ammonium sulfite; ferrous iron in the form of such salts as ferrous ammonium sulfate, and alkali metal thiosulfates. The preferred redox combination is potassium persulfate and sodium bisulfite. Sufficient catalyst is added to achieve a suitable rate of polymerization and a high monomer conversion leading to a high yield of copolymer in a normal reaction period of 2 to 4 hours. A concentration of initiator equal to about 0.2 to 0.4% and of activator equal to about 0.4 to 0.8%, both based on the weight of the vinyl monomers, is usually sufficient to give the appropriate rate of reaction. The reaction can be carried out without the reducing agent present. When this is done, the lack of reducing agent is offset by using higher reaction temperatures, higher concentrations of oxidizing agent, or longer reaction times. Azo compounds, e.g., azobisbutyronitrile, can also be used.

The coupling polymers can be formed as conventional random-type polymers by adding all of the monomers to the reaction vessel simultaneously and allowing them to react in a random manner according to their relative concentrations and relative reactivities. The nature of such reactions is well known in the art of free radical polymerizations.

The coupling polymers of the invention are capable of bonding to a great variety of polymers and inorganic fillers. Bonding to the polymer is provided by the azide group. Under the influence of heat or ultraviolet radiation, with or without appropriate promoters, the azide group decomposes to an active species which bonds to substantially any thermoplastic polymer.

The promoter for activating the azide group using radiation can be built into the polymer chain by copolymerizing an appropriate actinic light sensitive vinyl monomer. It can also be added independently, prior to the curing step. Typical compounds which can be used as independent sensitizers are benzophenone, 2-chlorobenzophenone, 2-chloro-4'-methyl benzophenone, 4-chloro-4'-methyl benzophenone, Benzil, methylene blue, acetophenone, 2-methyl benzophenone, and 2-methylanthroquinone. Other sensitizers are reported in Tables X, XI and XII, page 245, of "Advances in Photochemistry" by Engel and Monroe, Wiley-Interscience, 1971, Vol. 8. In those cases where aryl azides are used, the aromatic portion of the azide can function as an energy absorber. If that energy is sufficient to activate the azide group, a sensitizer will not be necessary. Premature cross-linking or further polymerization of the polymer can be inhibited by means of a thermal stabilizer. Such stabilizers are well known in the art and are exemplified by di-t-butyl cresol, hydroquinone monomethyl ether, pyrogallol, quinone, hydroquinone, t-butyl catechol, phenol, n-butyl phenone, phenothiazine, and nitrobenzene. When used in an amount within the range of about 0.01 to 2% by weight of copolymer, these stabilizers prevent crosslinking of the coupling polymer during processing and storage.

Any polymer can be bonded to an inorganic filler using the copolymers of this invention. Exemplary of the polymers which can be so bonded are the hydrocarbon polymers including saturated, unsaturated, linear, atactic, crystalline or non-linear amorphous polymers, copolymers, terpolymers, etc., as for example, polyethylene, polypropylene, poly(4-methyl-pentene-1), polybutene-1, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other. In addition, non-hydrocarbon polymers including the cellulose esters such as cellulose acetate butyrate, cellulose partial alkyl ethers such as hydroxyethyl and hydroxylpropyl cellulose; polyesters such as poly(ethylene terephthalate), drying and non-drying alkyd resins, etc.; poly(alkylene oxides) such as poly(ethylene oxide) and poly(propylene oxide), etc.; poly(arylene oxides) such as poly(phenylene oxide), etc.; the polyamides such as nylon 6 and 66, etc.; and poly(vinyl alkyl ethers) such as poly(vinyl methyl ether), etc.; vinyl chloride polymers containing at least 10 mole percent of vinyl chloride such as poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers such as the vinyl chloride-vinyl butyral copolymers, vinyl chloride-vinylidene chloride-acrylonitrile terpolymers, vinyl chloride-vinyl acetate-maleic anhydride terpolymers, etc.; chlorinated natural rubber; ethylene-vinyl acetate copolymers; poly(vinylidene chloride); vinylidene chloride-acrylonitrile copolymers; poly(ethyl acrylate); poly(ethyl methacrylate); polysulfone; epoxy resins; poly-[3,3-bis(chloromethyl)oxetane]; and butadiene-acrylonitrile-styrene terpolymers.

The materials or substrates to which the polymers can be bonded, as stated above, include siliceous materials such as glass, asbestos, sand, clay concrete, stone, brick, ceramic materials, etc.; metals such as aluminum, cadmium, chromium, copper, magnesium, nickel, silver, tin, titanium, zinc, etc., and alloys of the metals such as brass, bronze, steel, nickel chrome, etc.; and including metals which have been surface treated with phosphates, chromates, etc.; metal oxides such as aluminum oxide, iron oxide, lead oxides, titanium dioxide and zinc oxide. These materials to which the polymers can be bonded can be in various forms such as sheets, plates, blocks, wires, cloth, fibers, particles or powders. For example, in accordance with this invention, a polymer can be bonded to glass fibers, cord, plates, or cloth, asbestos sheets or fibers, siliceous fillers such as silicon dioxide (sand) or clay, metal sheets, plates or wires, metal oxide pigments, polymer sheets, woven fabric or fibers.

In a polymer-inorganic composite prepared according to this invention, the ratio of polymer to inorganic material can vary widely, depending upon the objective to be accomplished. For example, if a filled polymer is the objective, the polymer can comprise 10 to 80% by weight of the structure. A coated metal workpiece may have only 5% or less of polymer. If the polymer is employed as a binder, e.g., for a glass fiber molding, it may be 55 to 60% of the total weight of the structure.

The bonding process can be carried out in various ways. For example, the filler can be coated with a solution of the polymer and allowed to dry, thus inducing bonding through the silyl group. Another polymer can be bonded to the thus treated filler at the decomposition temperature of the azide group. By another method, the coupling polymer and the other polymer can be deposited together on the filler material and then heated to the decomposition temperature of the azide group. By still another method, another polymer can be treated with the coupling polymer so as to react the azide functional group under conditions such that silane condensations do not occur. Subsequently, the filler material can be contacted with the thus treated polymer so that coupling occurs through the silyl group. In another way of proceeding, the coupling polymer can be prepared in the presence of the other polymer and the filler. When using this technique, the monomers and the free radical initiator are added to the polymer-filler matrix and copolymerization takes place during processing. No matter which method is used, it will be necessary, in accordance with this invention, to heat or irradiate the coupling polymer to initiate the bonding reaction through the azide group. The temperature at which bonding is effected can be varied over a wide range, depending upon the specific coupling polymer employed. In general, however, the temperature will be in the range of from about 70° C. to about 350° C. The light used for irradiation can be of the continuous or pulsed type. A wavelength in the range of 254 to 300 mm. is desirable. However, as the thickness of the sample or its opacity is increased, longer wavelength light and sensitizers and pulsed light is preferred. Generally, when pulsed light is used, heat is also produced which aids in the decomposition of the azide to produce the desired nitrene intermediate. Various amounts of coupling polymer can be used, depending upon the specific compound, the surface area to be covered, the polymer to be bonded to the filler, etc. Generally, concentrations of from about 0.01 percent to about 20.0 percent, more perferably from about 0.05 percent to about 5.0 percent by weight, based on filler weight are employed. In general, the coupling polymer will be employed in the form of a solution which can be sprayed, brushed, or poured over the surface of the filler. Alternatively, the filler can be dipped into a solution or emulsion of the coupling polymer. These new coupling polymers are generally soluble in one or more organic solvents such as methylene chloride, ethylenedichloride, trichloroethylene, perchloroethylene, ethanol, isopropyl alcohol, acetone, methyl ethyl ketone, benzene, toluene, etc.

The invention is illustrated in the following examples. All parts and percentages are by weight unless otherwise specified.

EXAMPLE 1

Benzoic acid (200 parts) and chlorosulfonic acid (625 parts) were heated to 120°–130° C. for 3 hours under nitrogen with stirring. The cooled solution was poured into ice and the white solid was filtered and dried. The solid was dissolved in 150 parts of benzene and 100 parts of acetone, washed two times with salt water (saturated, 200 parts) to pH 7. The solution was dried, filtered and evaporated. The 230 parts of white solid were collected.

This white solid was refluxed with 600 parts of thionyl chloride under a nitrogen sweep. The solution was evaporated at 60°–70° C. at 10–20 mm Hg. Ether was added to the dark brown oil and evaporated. This procedure was repeated several times to yield 250 parts of a dark brown oil which was then distilled at reduced pressure to yield 205 parts of a clear water-white product.

The distilled product was added dropwise at 0° C. to 135 parts of sodium azide in 356 parts of acetone and 89 parts of distilled water. The solution was stirred for 5 hours at 0° C. and 500 parts of cold benzene and 400 parts of cold water added. The phase were separated and the benzene layer washed three times with 300 parts of cold water and dried. The benzene solution was refluxed overnight. The infrared spectrum of the product indicated no azidoformate band at 1730 cm$^{-1}$ and a large isocyanate band at 2250 cm$^{-1}$ equal in intensity to the sulfonylazide band at 2180 cm$^{-1}$. The 830 parts of benzene contained 0.211 parts/cc. of m-azidosulfonylphenyl isocyanate.

To a solution of 460 parts of benzene containing 0.09 part/cc. of m-azidosulfonylphenyl isocyanate was added 27.7 parts of hydroxyethyl methacrylate. The solution was stirred at 50° for 6 hours. The benzene was evaporated, leaving 60 parts of a yellow oil which crystallized on standing and cooling. The IR spectrum indicated the typical methacrylate unsaturation absorbance at 1650 cm$^{-1}$ and

absorbance at 3400 cm$^{-1}$.

To 15 parts of the above monomer in 104 parts of dry tetrahydrofuran was added 30 parts of 3-trimethoxysilylpropyl methacrylate (Union Carbide). This solution was heated to 65°±5° C. and sparged under nitrogen for 15 minutes. 0.25 Part of benzoyl peroxide was added and heated for 8 hours at 60° C. An additional 100 parts of dry tetrahydrofuran was added along with 0.2 part benzoyl peroxide and the solution was heated for an additional 8 hours. When infrared indicated that all the methacrylate double bond had disappeared, 2 parts of hydroquinone was added. The final copolymerized solution contained 18.9% solids and Gel-Permeation Chromatography indicated a weight average molecular weight of 1740. The infrared spectrum of a similar copolymer precipitated 3 times from tetrahydrofuran solution by the addition of water and redissolved in tetrahydrofuran indicated that the azide moiety was retained as determined by the azide absorbance at about 2180 cm$^{-1}$ in the infrared spectrum.

Two 28"×7" glass cloth strips were dipped in a 0.7% solution of the above polymer for 5 minutes with agitation. The treated glass fabrics were cut to 5¾" squares. Twelve of these glass squares were stacked alternatively with 15 similar squares of 5 mil polypropylene sheets. Each of the laminates was pressed at 22° C. for 5 minutes at contact pressure, then at 9 tons (3000 p.s.i. on laminate) for 5 minutes, after which the laminate was cooled to ambient temperature at this pressure. The formed laminate was cut into 3"×½" strips and tested for flexural strength. The results are recorded in Table I along with a control for comparison.

EXAMPLE 2

Sixty parts of a hard South Carolina air-floated Kaolin Clay (Huber) was wetted with 225 parts of tetrahydrofuran and 3.2 parts of the tetrahydrofuran solution of the polymer described in Example 1 was added (i.e., the clay was coated with 1% polymer). The solvent was removed under water aspirator vacuum while rotating at 80° C. for 30 minutes. The resulting powder was air dried overnight at room temperature.

Seventy-five parts of polypropylene was ribboned on a two-roll mill and 50 parts of the treated clay filler was gradually added over a period of 5-10 minutes. The blend was removed from the mill, sheeted, cooled, and then chopped into small pieces (¼") in a Wiley mill. This material was put through the minijector and small test pieces (dogbone shape) were injection molded in the usual manner for evaluation of tensile, elongation, modulus and impact according to standard ASTM procedures. The data for this example are recorded in Table II.

EXAMPLE 3

Polypropylene/glass laminates were prepared as described in Example 1 except that the glass was sized with a 0.7% solution of the silane and azide monomers in a ratio of 2:1 which also contained 2%, based on the weight of the monomers of bis-t-butylperoxydiisopropylbenzene. The copolymerization of the monomers in this example occurs during the lamination procedure either prior to or substantially simultaneously with the azide cross-linking step and the association of the silane portion of the copolymer with the glass. Glass laminates prepared from a solution of the 3-trimethoxysilylpropylmethacrylate containing peroxides does not produce laminates of significantly higher strengths than those which do not contain peroxide. Testing results are presented in Table 1.

EXAMPLE 4

To 20 parts of 3-trimethoxysilylpropyl methacrylate and 10 parts of 2-azidoformyloxyethyl methacrylate (prepared as described in U.S. Pat. No. 3,369,009) in 55 parts of tetrahydrofuran sparged under nitrogen for 30 minutes was added 0.16 part of benzoyl peroxide. This solution was heated to 60° C. for 6 hours when 0.1 part of p-dimethoxybenzene was added to quench the polymerization reaction. A clear film was cast on a sodium chloride infrared plate and the IR spectrum of the dried film indicated azide absorbance at about 1730 and 2130 cm$^{-1}$ and little methacrylate double bond absorbance at about 1650 cm$^{-1}$. Polypropylene/glass laminates prepared with a 0.7% tetrahydrofuran solution of this copolymer were tested for flexural strength. The resulting data are recorded in Table I.

EXAMPLE 5

To 20 parts of 3-trimethoxysilylpropyl methacrylate (Union Carbide), 10 parts of 2-azidoformyloxyethyl methacrylate, 10 parts of phenylvinylketone and 10 parts of norbornyl methacrylate in 200 parts of tetrahydrofuran sparged for 30 minutes under nitrogen was added 0.16 part of benzoyl peroxide. This solution was heated to 60° C. for 12 hours when infrared indicated the vinyl unsaturation at about 1650 cm$^{-1}$ had disappeared. At this point, 0.2 part of hydroquinone was added. Polypropylene/glass laminates were prepared with a 0.7% tetrahydrofuran solution of this copolymer as described in Example 1 except that the laminate was heated to only 80° C. at 3000 lbs. pressure to prevent azide decomposition and cross-linking during the molding operation. This laminate was then subjected to a 60 second exposure from a glass-filled pulsed Xenon flash source fitted with a reflector. This lamp had a 15-second on/off cycle and intensity of 15 mwatt/cm$^2$ at a wavelength of 360 nm. The tensile properties of this laminate are recorded in Table I.

TABLE I

POLYPROPYLENE/GLASS LAMINATE DATA

| Coupling Agent | Wt. % Concentration of Solution | Strength (psi) | Modulus (psi) | Deflection |
|---|---|---|---|---|
| Copolymer of Example 1 | 0.7 in THF* | 28,300 | 180,000 | 0.096 ± 0.003 |
| None | — | 10,100 | 120,000 | 0.077 ± 0.003 |
| Silane** + peroxide (100:1 ratio) | 0.7 in THF | 16,300 | 140,000 | 0.044 ± 0.003 |
| Silane (alone) | 0.7 in CH$_2$Cl$_2$ | 16,155 | — | — |
| Copolymer of Example 3 | 0.7 in THF | 30,000 | 203,000 | 0.1 ± 0.004 |
| Copolymer of Example 4 | 0.7 in THF | 23,000 | 209,000 | 0.072 ± 0.003 |
| Copolymer of Example 5 | 0.7 in THF | 39,000 | 211,000 | 0.108 ± 0.004 |

*Tetrahydrofuran
**3-trimethoxysilyl propyl methacrylate + α,α-bis-t-butylperoxy diisopropyl benzene

TABLE II

CLAY/POLYPROPYLENE DATA

| Filler | Coupling Agent | Tensile (psi) | Elongation % | Modulus (psi) | Impact (ft.lbs/in.$^2$) |
|---|---|---|---|---|---|
| Clay | None | 4420 | 14 | 190,000 | 27 |
| Copolymer of Example I | 1% | 5900 | 20 | 200,000 | 35 |

What I claim and desire to protect by Letters Patent is:

1. A coupling polymer comprised of (a) 20-80% by weight of an ethylenically unsaturated monomer containing at least one azide group; (b) 20-80% by weight of an ethylenically unsaturated silane monomer wherein the silicon molecule is substituted with at least one hydrolyzable radical; (c) 0-60% by weight of an ethylenically unsaturated monomer containing no azide or silane functional group; and (d) 0-10% by weight of an ethylenically unsaturated monomer which is capable of absorbing actinic radiation and containing no azide or silane functional group.

2. A coupling polymer according to claim 1 wherein the silane monomer is selected from the class consisting of vinyl triethoxy silane, vinyl-tris-(2-methoxyethoxy)-silane, gamma-methacryloxypropyltrimethoxy silane, N-gamma-aminopropyltrimethoxy silyl-N-m-vinylbenzylamine, and N-gamma-aminopropyltrimethoxy silyl-m-vinylphenyl carbamate.

3. A coupling polymer according to claim 2 wherein the azide group in the ethylenically unsaturated monomer containing at least one azide group is a sulfonyl azide group.

4. A coupling polymer according to claim 3 wherein the ethylenically unsaturated monomer containing at least one azide group is methacryloylethyl-m-azidosulfonylphenyl carbamate and the silane monomer is 3-trimethoxysilylpropyl methacrylate.

5. A coupling polymer according to claim 2 wherein the azide group in the ethylenically unsaturated monomer containing at least one azide group is an azidoformate group.

6. A coupling polymer according to claim 5 wherein the ethylenically unsaturated monomer containing at least one azide group is 2-azidoformyloxyethyl methacrylate and the silane monomer is 3-trimethoxysilylpropyl methacrylate.

* * * * *

UNITED STATES PATENT AND TRADEMARK OFFICE
CERTIFICATE OF CORRECTION

PATENT NO. : 4,277,593
DATED : July 7, 1981
INVENTOR(S) : Bernard J. Scheve (Case 3)

It is certified that error appears in the above-identified patent and that said Letters Patent are hereby corrected as shown below:

```
Column 1, line 29 " polyme " should read
  -- polymer --;

Column 1, line 34 " machine " should read
  -- molecule --;

In the Claims, Col. 14, Claim 1, line 61,
  " jnsaturated " should read -- unsaturated --.
```

Signed and Sealed this

Eighth Day of September 1981

[SEAL]

Attest:

GERALD J. MOSSINGHOFF

Attesting Officer

Commissioner of Patents and Trademarks